March 24, 1964     F. B. BRADY     3,126,521
VISIBILITY MEASUREMENT
Filed Sept. 27, 1960     3 Sheets-Sheet 1
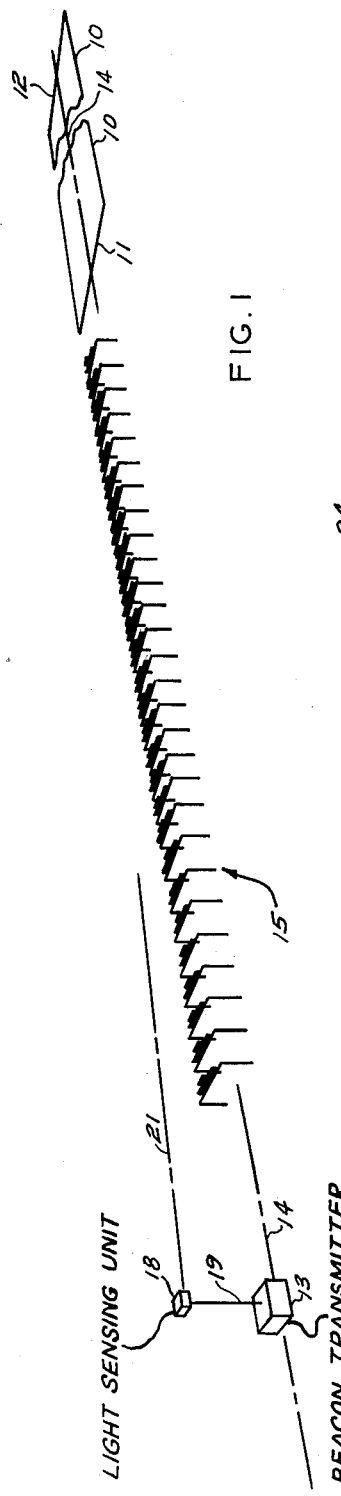
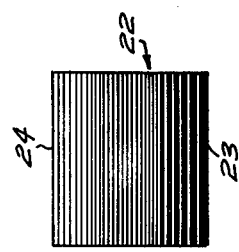
FIG.3
FRANK B. BRADY
INVENTOR
BY Rankin A. Milliken
ATTORNEY March 24, 1964   F. B. BRADY   3,126,521
VISIBILITY MEASUREMENT
Filed Sept. 27, 1960   3 Sheets-Sheet 2

FRANK B. BRADY
INVENTOR

BY *Rankin A. Milliken*
ATTORNEY

United States Patent Office 3,126,521
Patented Mar. 24, 1964

3,126,521
VISIBILITY MEASUREMENT
Frank B. Brady, Washington, D.C., assignor to Link Division of General Precision, Inc., Binghamton, N.Y., a corporation of Delaware
Filed Sept. 27, 1960, Ser. No. 58,797
5 Claims. (Cl. 340—26)

This invention relates to method and apparatus for determining visibility under varying atmospheric conditions and, more particularly, to method and apparatus for determining and/or indicating visibility at or around the approach area of an airfield landing strip in order that pilots of aircraft effectively and accurately may be apprised of actual visibility conditions and be enabled either to land aircraft safely or to abort approaches in case of insufficient visibility. Under certain weather conditions the visibility may vary rapidly and drastically in the approach area of a landing field.

Radio navigation and instrument approach equipment is commonly used to guide airplanes from airport to airport, and along descending glide paths on final approaches to airport landing strips. Instrument approach systems, although sometimes loosely called instrument landing systems, are not generally regarded as sufficiently reliable to allow completely blind control of a descending aircraft all the way to touchdown, and unless pilot visibility is sufficiently good within a "critical aproach area," pilots are instructed not to attempt landings. The critical approach area may be said to be generally the portion of the glide path between the middle marker and the runway threshold. Safe and efficient airport traffic control requires, or else is aided considerably by, means which are capable of determining and indicating to the pilot, and/or to the airport traffic controller, the instantaneous visibility conditions prevailing in the critical approach area.

It is, therefore, an object of this invention to provide safety device means whereby the instantaneous visibility in the "critical approach area" may be determined at any time.

It is a further object of this invention to provide safety device means whereby the instantaneous visibility in the "critical approach area" may be indicated in the airport control tower at all times.

Yet another object of this invention consists in the provision of safety device means whereby the instantaneous visibility in the "critical approach area" may be indicated in an instrument in the cockpit of any aircraft approaching said "critical approach area."

Still another object of this invention is the provision of safety device means whereby the intensity of airport landing lights may be controlled in accordance with the visibility in the "critical approach area."

Other objects of the invention will in part be obvious and will in part appear hereinafter.

The invention, accordingly, comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 represents an airport having a conventional landing light system and a light-sensing unit according to the instant invention.

FIG. 3 represents a graduated filter used in the instant invention.

Figure 2:
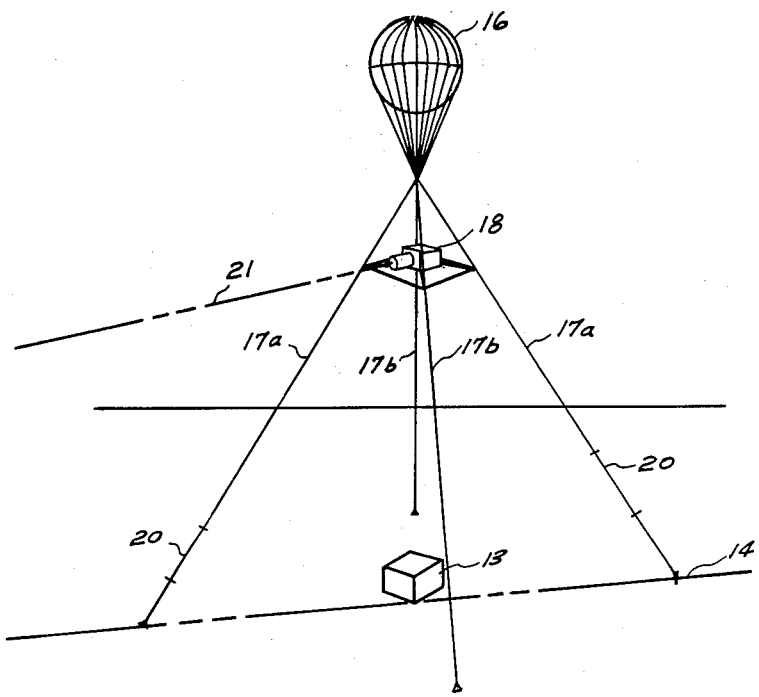
FIG. 2 represents one alternative means for positioning the light sensing unit according to the instant invention.

In FIG. 1 there is shown an airfield landing strip 10 having a threshold or "near" end 11 and a far end 12. Indicated by block 13 is a middle marker beacon transmitter, which is located on the ground approximately 3500 feet out along the runway centerline 14 from the runway threshold, and which is arranged to transmit coded radio signals upwardly, so that an aircraft marker beacon receiver may receive the coded signals as the aircraft passes over the transmitter, so that the pilot may be informed that he is approximately 3500 feet out. Some landing fields also are provided with inner markers by locating similar transmitters to transmit upwardly at the runway threshold.

Extending outwardly from the runway threshold along the runway centerline 14 is an array 15 of runway approach light assemblies spaced at 100 foot intervals which are usually mounted on poles or H-frames, in a graduated sloping manner, with the outer approach lights mounted higher than the inner approach lights. Each approach light assembly consists of a plurality of high-intensity, steadily-burning sealed-beam "bar" lights, which are arranged in a horizontal line to form a bar of light, and a condenser discharge flashing light. Both the steadily-burning lights and the flashing light of each approach light assembly are pointed to aim toward an aircraft approaching on a proper glide path. The condenser-discharge lights each produce successive high-intensity flashes of approximately $10 \times 10^6$ peak candlepower, with each flash having a duration of approximately 200 microseconds, thereby providing an effective candlepower of approximately 10,000. The plurality of flashing lights are electrically controlled to fire or flash in sequence, so that a pilot making an approach appears to see a white streak moving at high speed toward the runway threshold. The streak moves from the outermost approach light assembly to the runway threshold assembly in one-half second, and the sequence is repeated two times each second. Although the flash duration and sequencing of successive lights do not actually overlap, the retention characteristics of the human eye create an illusion of overlap. The primary function of the flashing condenser discharge lights is to provide positive identification to the pilot that he is observing runway approach lights, in order that he not mistake them for other runway lights, or other rows of lights, such as street lights along a highway. Sometimes foggy weather prevents a pilot from actually observing the actual flashing light sources themselves, but the characteristic "moving streak" flashes illuminating the fog give him the necessary assurance to continue his approach, until such time as he can positively see the steadily burning bar lights.

All of the abovedescribed portion of FIG. 1 is a well-known and standard approach lighting system and its details are not part of the present invention.

In accordance with the present invention a light-sensing unit 18 such as a photocell unit, is located well above the ground (for instance, on a mast, or pole, 19) approximately at the middle marker location, with the unit pointed along a line-of-sight such as 21 in the general direction of the runway threshold.

The light-sensing unit is located at a slightly lower altitude than the height of an aircraft on a proper glide path and preferably held in place by frangible means in order to minimize damage to any aircraft which might accidentally strike it. A preferred method of mounting consists of a single frangible pole having a flexible or hinged upper portion adapted to fold down if struck by an aircraft. An alternative method of mounting the light sensing unit is shown in FIG. 2, wherein an inflated lighter-than-air balloon 16 carrying the light-sensing unit 18 is secured by four guys 17a and 17b spaced at 90 degrees. The fore and aft guy cords 17a are each attached to the ground by frangible links 20. Wind forces are insufficiently strong to fracture the links and the four guys maintain the light-sensing unit pointed at the runway, generally along line-of-sight 21, even in the presence of wind. The viewed angle of the light-sensing unit includes all twenty-eight approach light assemblies, so that the flashing of any one of the condenser discharge lights will, in clear weather, be sensed by the light-sensing unit and converted to an electrical pulse. A conventional focusing lens may be provided to fix the viewed angle and focus received light on a photosensitive element, such as an ordinary photomultiplier tube, a phototransistor, or equivalent light-to-electrical-signal transducer. The outer flashing lights of array 15 will, of course, be more easily sensed by the light-sensing unit than those near the runway threshold, and to tend to equalize the amplitudes of the pulses, optical means, such as graduated filter 22 of FIG. 3 may be inserted into the sensing unit. When mounted in operative position the more opaque edge 23 of said filter will generally be disposed below the less opaque edge 24.

In some embodiments of the invention it may be desirable to control various conditions in accordance with the magnitude of "ambient" light, i.e., the steady light viewed by the light-sensing unit and caused by the steadily-burning approach lights and/or daylight. The D.C. level of the photocell or phototransistor may be sensed and used for self-regulation, for example, by controlling a shutter of the type used in a number of contemporary light-meter controlled cameras, thereby assuring that the photocell or phototransistor will not saturate during good visibility or daylight conditions. Conventional AGC circuits as shown schematically at 30 in FIG. 4 may be employed in the amplifier unit 27.

Figure 4:
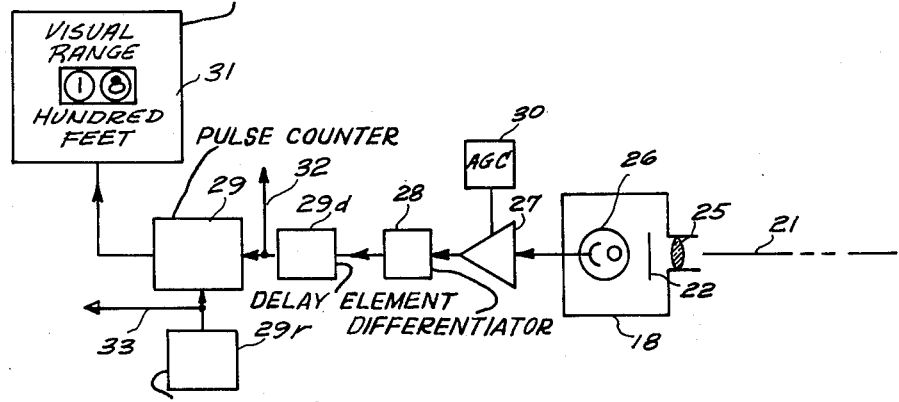
FIG. 4 represents in schematic form a circuit which may be used in carrying out the instant invention.
Figure 5:
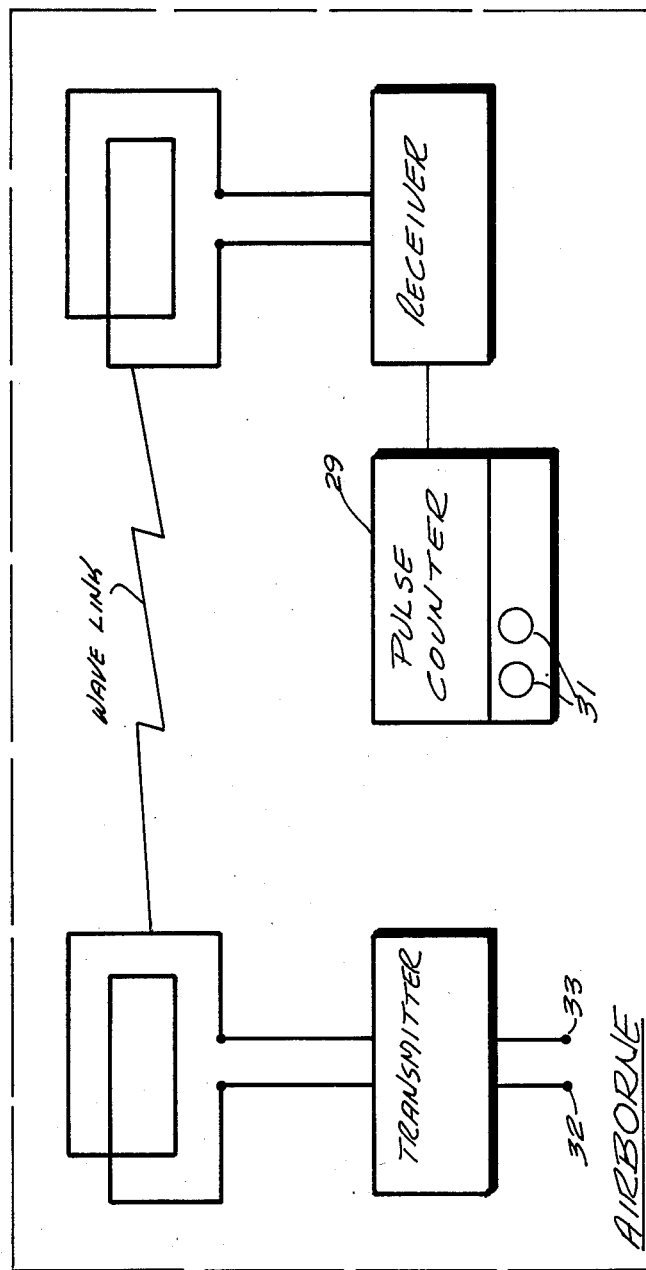
FIG. 5 represents in schematic form a further circuit which may be used in carrying out the instant invention.

As shown in FIG. 4 the pulses from the light-sensing unit 18 are amplified by amplifier 27 and differentiated by differentiator 28 (which may, for instance, be a conventional RC network) to provide further pulses. By differentiating the output signal from the light-sensing unit the steady or D.C. component of the sensing unit signal is eliminated, so that the amplified further pulses have no component caused by daylight or reception of light from the steadily-burning approach lights. The further pulses then may be applied through a delay element 29d, the purpose of which will be explained hereinbelow, to operate a conventional electronic pulse counter 29. Pulse counter 29 may, for example, be a beam switching tube counter of the type described in U.S. Patent No. 2,852,194 to J. B. Wolfington.

The amplitude of the pulses from the light-sensing unit 18 will vary in accordance with the received intensity of the particular flash causing the pulse. In between the light-sensing unit 18 and the electronic counter 29, means may be provided to establish a pulse amplitude threshold, so that pulses below a predetermined amplitude, such as noise pulses, will be rejected and inoperative to advance the counter. Such means may be incorporated as a characteristic of conventional pulse-shaping circuitry which may be incorporated between the light-sensing unit 18 and the electronic pulse counter 29. For example, a conventional monostable multivibrator, or univibrator, circuit may be used to convert the substantially spike-shaped output pulses of the amplifying and differentiating unit to uniform block pulses more reliably handled by the counter, and the bias of the input circuit of the multivibrator may be adjusted to establish a desired pulse amplitude threshold.

In clear weather each of the condenser-discharge lights will be sensed by the sensing unit and during each half-second period the counter will count up to a number corresponding to the total number of condenser-discharge lights. In somewhat overcast or foggy weather, the change in light received by the sensing unit will be small or insignificant as those lights nearest the runway flash, and pulses insufficient in amplitude, or no pulses at all, will be available to advance the counter during the flashing of those lights nearest the runway. Thus, it will be seen that the count registered in the counter will be a direct measure of actual visibility. With the flashing lights spaced 100 feet apart, the count of the number of lights sensed is a direct measure of visibility of the critical approach area in hundreds of feet, which is a standard unit accepted for measuring runway visual range.

The pulse counter 29 includes two beam switching tubes the first of which registers single pulses and the second of which registers tens of pulses. The target leads of the first beam switching tube are connected to energize the successive, number-shaped electrodes of a well-known "nixie" indicator tube in display unit 31 to indicate at any desired remote location the number of hundreds of feet visibility, and the targets of the second beam switching tube are connected to energize the successive, numeral-shaped electrodes of a second "nixie" tube in display unit 31 to indicate the number of thousands of feet visibility.

In order to reset the pulse counter each time a new cycle of flashes begins and to energize the plates of the "nixie" tubes an auxiliary photo-detector 29r may be provided which is so located and/or so equipped with lenses or other suitable optical means as to be responsive only to the flashes from the flashing landing light nearest the middle marker. The pulses from said auxiliary photo-detector 29r are applied to the reset input lead of the pulse counter 29 and to the plate leads of the "nixie" tubes. In the event that the pulse from 29r is shorter than the ionization time of the "nixie" tube, it may be necessary to provide a univibrator to extend said pulse beyond the ionization time of the "nixie" tube. Delay unit 29d is provided to delay the first pulse from light sensing unit 18 (and, of course, every other pulse from light sensing unit 18) sufficiently so that the reset cycle of the counter initiated by auxiliary photo-detector 29r is completed before the first pulse from sensing unit 18 is impressed upon the counter. In this way, the first impulse in each chain of impulses received from sensing unit 18 is not "lost" even though the flashing light nearest the middle marker "triggers" the auxiliary photo-detector 29r and the light sensing unit 18 at the same time.

In some installations auxiliary photo-detector 29r may be replaced by a direct connection to the energizing source for the flashing light nearest the middle marker. Such a connection will, of course, include suitable pulse conditioning means such as a step-down transformer.

The electronic counter 29 may be connected to display unit 31 to display the visibility measurement at various indicators in the airport control tower, at weather stations, and at other ground installations. The circuit of FIG. 4 also may be arranged to transmit radio signals to surrounding aircraft, providing telemetered approach area visibility information. This may be accomplished, for instance, by transmitting to a two-channel receiver in an aircraft the pulses derived from leads 32 and 33 of FIG. 4. These pulses as received at said receiver, and demodulated, may be used to drive a counter and indicator corresponding to 29 and 31 located on board the aircraft. The indicator may, preferably, be so located as to be easily seen by the pilot of said aircraft at all times during instrument landing.

Alternatively, the counter 29 may be arranged to operate suitable converter means to change the pulse count to a recorded, spoken number with which to modulate the voice channel of the ILS transmitter at the runway in use.

The counter also may be connected to control automatically the intensity of both the steadily-burning approach lights and the runway lights.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an aircraft landing system the combination of: an array of sequentially flashing landing lights; light-sensitive means positioned near one end of said array and arranged to produce an output signal in response to each flash of each one of said lights during conditions of optimum visibility; indicator means located remotely from said light-sensitive means; counter circuit means adapted to count said output signals corresponding to each sequence of flashes of said lights, and means responsive to said counter circuit means to actuate said indicator means, whereby said indicator means indicates, in both conditions of optimum and less-than-optimum visibility, the visibility along said array.

2. The combination claimed in claim 1 in which said indicator means is located in the control tower from which control is exercised over the runway with which said array of sequentially flashing landing lights is associated.

3. The combination claimed in claim 1 in which said indicator means is located in an aircraft.

4. The combination claimed in claim 2 in which an additional one of said indicator means is located in an aircraft.

5. The combination claimed in claim 1 in which said light-sensitive means is mounted upon a frame carried by a plurality of guy wires the lower ends of which are anchored to the ground and the upper ends of which are secured to lighter-than-air balloon means.

References Cited in the file of this patent

UNITED STATES PATENTS

| | | |
|---|---|---|
| 2,489,220 | Herbold | Nov. 22, 1949 |
| 2,797,367 | Scott | June 25, 1957 |

FOREIGN PATENTS

| | | |
|---|---|---|
| 571,290 | Great Britain | Aug. 17, 1945 |
| 683,860 | Great Britain | Dec. 3, 1952 |